Oct. 20, 1970                E. G. CRITTENDEN                3,535,434
PROCESS AND APPARATUS FOR PRODUCING PHOTOGRAPHIC BLOCKERS
Filed March 5, 1966                                       2 Sheets-Sheet 1

INVENTOR.
ESTIL G. CRITTENDEN
BY Wm. R. Price
ATTORNEY

Oct. 20, 1970    E. G. CRITTENDEN    3,535,434
PROCESS AND APPARATUS FOR PRODUCING PHOTOGRAPHIC BLOCKERS
Filed March 5, 1968    2 Sheets-Sheet 2
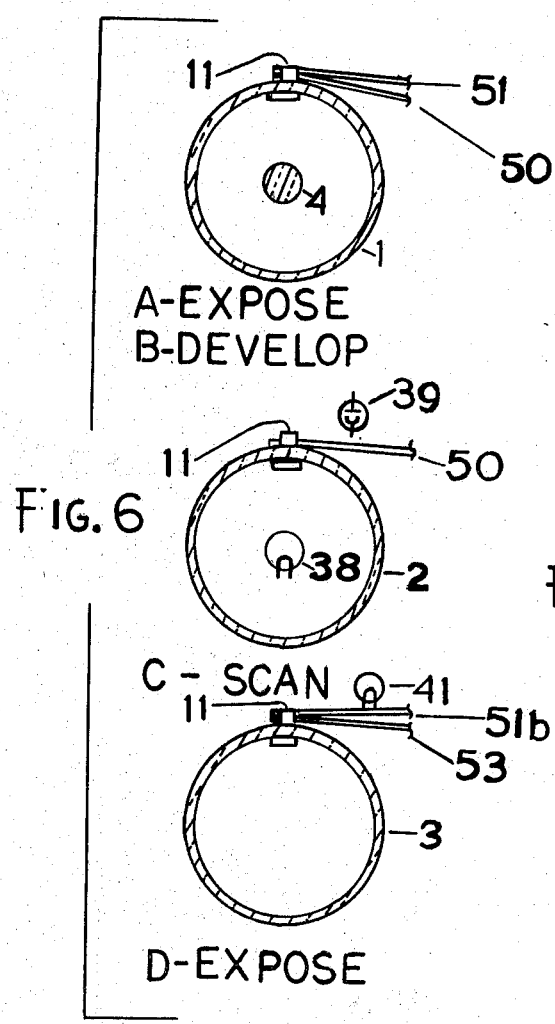
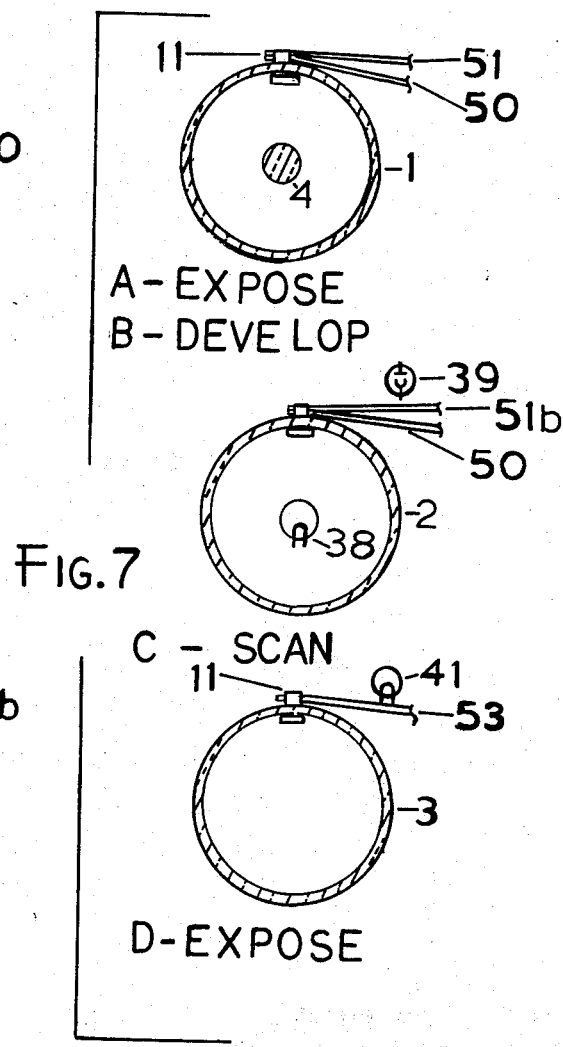
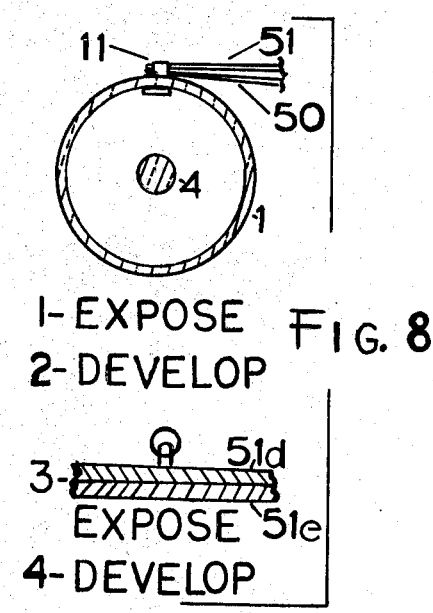
INVENTOR.
ESTIL G. CRITTENDEN
BY Wm R. Price
ATTORNEY

United States Patent Office 3,535,434
Patented Oct. 20, 1970

3,535,434
PROCESS AND APPARATUS FOR PRODUCING PHOTOGRAPHIC BLOCKERS
Estil G. Crittenden, 3823 Downing Way,
Louisville, Ky. 40218
Filed Mar. 5, 1968, Ser. No. 710,474
Int. Cl. H04n 9/10, 9/14
U.S. Cl. 178—5.2        29 Claims

ABSTRACT OF THE DISCLOSURE

Discloses an apparatus designed for use with an electronically controlled color correction machine, which produces a photographic blocker which may be used to block a portion of an image photoelectrically transmitted from a transparency on said electronically controlled color correction machine to a photographic film. Discloses additionally, the process of utilizing the photographic blocker to block a portion of the image so transmitted.

FIELD OF THE INVENTION

This invention relates to a method and means for producing a photographic blocker to be used in conjunction with an electronic scanner or an electronically controlled color correction machine designed to produce color separations from one color diapositive for all printing processes. More specifically, this invention relates to the production and use of a photographic blocker wherein a portion of an image, photoelectrically transmitted from a color diapositive or transparency to a photographic film, is photographically blocked.

BACKGROUND OF THE INVENTION

In the commonly used methods of preparing color printing plates or color printing cylinders for rotogravure, color separations must be made for each of the plates or cylinders.

In view of the fact that color printing is a case of additive and/or subtractive color mixing, it is necessary to produce, in rotogravure, a negative and/or a positive for each of the colors—yellow, cyan, magenta and key. It is thus necessary to separately expose four photographic films through the color diapositive or transparency with light of various wave lengths so as to produce a negative or positive containing the yellow portion of the transparency; the cyan portion of the transparency, etc., from which the individual rotogravure cylinders may be obtained. The developed etching resist negatives are then placed over the copper cylinders and etched with ferric chloride to produce ink wells or cells in the cylinders surface proportional in size and depth to the density of the image on the transparency. These exposures have been through large printing frames so that proper registry of the matter on the exposed negatives and on the cylinder is obtained.

DESCRIPTION OF THE PRIOR ART

Recently, there have been introduced electronic scanners for successively producing continuous tone positives or negatives from a single color diapositive. These color extractions or separations, are taken from the copy to be reproduced in the form of photo cell currents produced in synchronous pointwise and linewise scanning of such photographic extractions by means of a moving light spot and respectively associated photocells; whereby the light reflected from or passed through the picture point is by means of a prism spectrally separated into three basic colors or by means of three beam paths into which are interposed color filters. One such apparatus is the Hell Chromograph, which is described in detail in U.S. Pats. 2,993,087 and 3,099,706. With this apparatus, the color transparency is mounted on a transparent scanning cylinder which is mechanically connected to an exposing cylinder on which an unexposed photographic film is mounted. A moving light spot in the middle of the transparent scanning cylinder transmits light through the transparency onto a synchronously moving photoelectric cell and the current thus developed is photoelectrically transmitted to the unexposed photographic film on the exposing cylinder.

If the transparency or diapositive has a defect, (as, for example, a reddish cast or spot), this must be corrected prior to photoelectrically transmitting the image to the photographic film. This correction can be made by hand by actually retouching the transparency so as to remove the objectionable material. However, in commercial rotogravure, the transparencies cannot be retouched without the consent of the customer. Unless four separate negatives and/or positives are manually retouched, a photographic blocker must be prepared.

In conventional rotogravure, this is done by superimposing an unexposed film over the transparency in a printing frame and exposing said film through the transparency with a complementary ray of light relative to the defect. In the case of red, a wave length corresponding to a blue filter would be used to expose on the photographic film only the reddish cast desired to be removed from the finished copy. In some instances, as for example, a cloudy background, an exposure with a low intensity light would be sufficient to expose the cloudy background without exposing the film to the denser colors on the transparency.

However, due to the thickness of the transparency on the scanning cylinder and of the photographic film on the exposing cylinder, a blocker produced in a printing frame, will cause a displacement of the image on the blocker when it is mounted over the photographic film on the exposing cylinder. This is due to the difference in circumference of the cylinder relative to the circumference of the cylinder plus the photographic film. The result is that due to the unequal displacement of the image on the blocker relative to the photographic film, that the two will not be in perfect registry and that desired portions will be blocked while unwanted portions will be exposed.

SUMMARY OF THE INVENTION

According to my invention, an accessory piece of equipment to be used in conjunction with an electronically controlled color correction machine, said equipment having a curved surface, having an identical curvature to the curvature of the scanning and exposing cylinders of said electronically controlled color correction machine, is used to make a photographic blocker by mounting a color transparency and an unexposed photographic film on said curved surface and passing light through unwanted portions of said transparency to expose only those portions on the unexposed film and developing said film to produce a photographic blocker.

The photographic blocker, thus produced, may be then mounted over the transparency on said electronically controlled color correction machine or over the unexposed photographic film on said electronically controlled color correction machine so that an undesired portion of the image to be photoelectrically transmitted from the transparency to the film may be blocked. By use of identical mounting means on the curved surface of the accessory equipment, and on the curved surfaces of the electronically controlled color correction machine, perfect registry is obtained between the unexposed film and the blocker relative to the image photoelectrically transmitted from the transparency. Since the curvature of the three surfaces are identical, the displacement of the blocker is corrected so that the blocker is in perfect registry with the portion of the image which is desired to be blocked.

BRIEF DESCRIPTION OF THE DRAWINGS

FIG. 6 is a diagrammatic illustration of the method of making and using the photographic blocker of this invention.

FIG. 7 is a diagrammatic illustration of another method of using the photographic blocker of this invention.

FIG. 8 is a diagrammatic illustration of another method of making a blocker.

DESCRIPTION OF THE PREFERRED EMBODIMENTS

Figure 1:
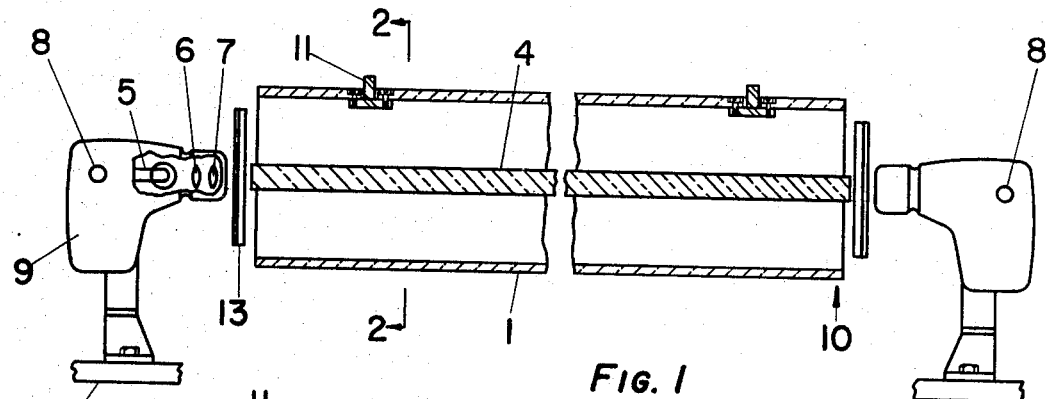
FIG. 1 is a side elevation, partially in section, of the apparatus of my invention.
Figure 2:
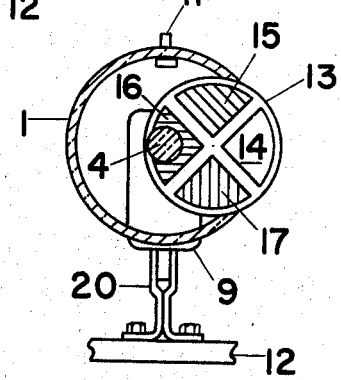
FIG. 2 is a sectional view, taken along lines 2—2 of FIG. 1 illustrating the relation of the cylinder and light transmitter to the filter wheel.

Referring to the drawings in detail, the apparatus for producing the photographic blocker is designated generally by the numeral 10. Basically, this apparatus consists of a transparent exposing cylinder 1 which is of the same dimension and has an identical curvature to the scanning cylinder 2 of the electronic scanner 30. Mounted at the midpoint of the diameter of the exposing cylinder 1 is a light pipe 4 having a longitudinal axis which coincides with the longitudinal axis of the exposing cylinder 1. This light pipe is preferably made from a rod of a fiber optic material such as Plexiglas, which has been uniformly roughened around its circumferential surface to produce a light diffusing surface. At either end of the light pipe 4 is a light source 5 in the form of an incandescent bulb and a lens system 6 and 7 to direct the light rays along the longitudinal axis of the light pipe 4. The intensity of the light source 5 may be varied by use of a Variac 8, mounted in housing 9. A series of mounting pins 11 project through the cylinder 1 and are of identical size and located identically on the scanning cylinder 2 and the exposing cylinder 3 of the electronic scanner 30. Interposed between the light source 5 and lenses 6 and 7 and the light pipe 4, is a filter wheel 13 which as shown in FIG. 2, normally contains a clear filter 14, a green filter 15, a blue filter 16, and a red filter 17. The housing 9 is attached to bracket 20, which in turn, is attached to base 12. The cylinder, is rotatably journaled by means not shown so as to allow good contact between the transparency 50 and the film 51.

Figure 3:
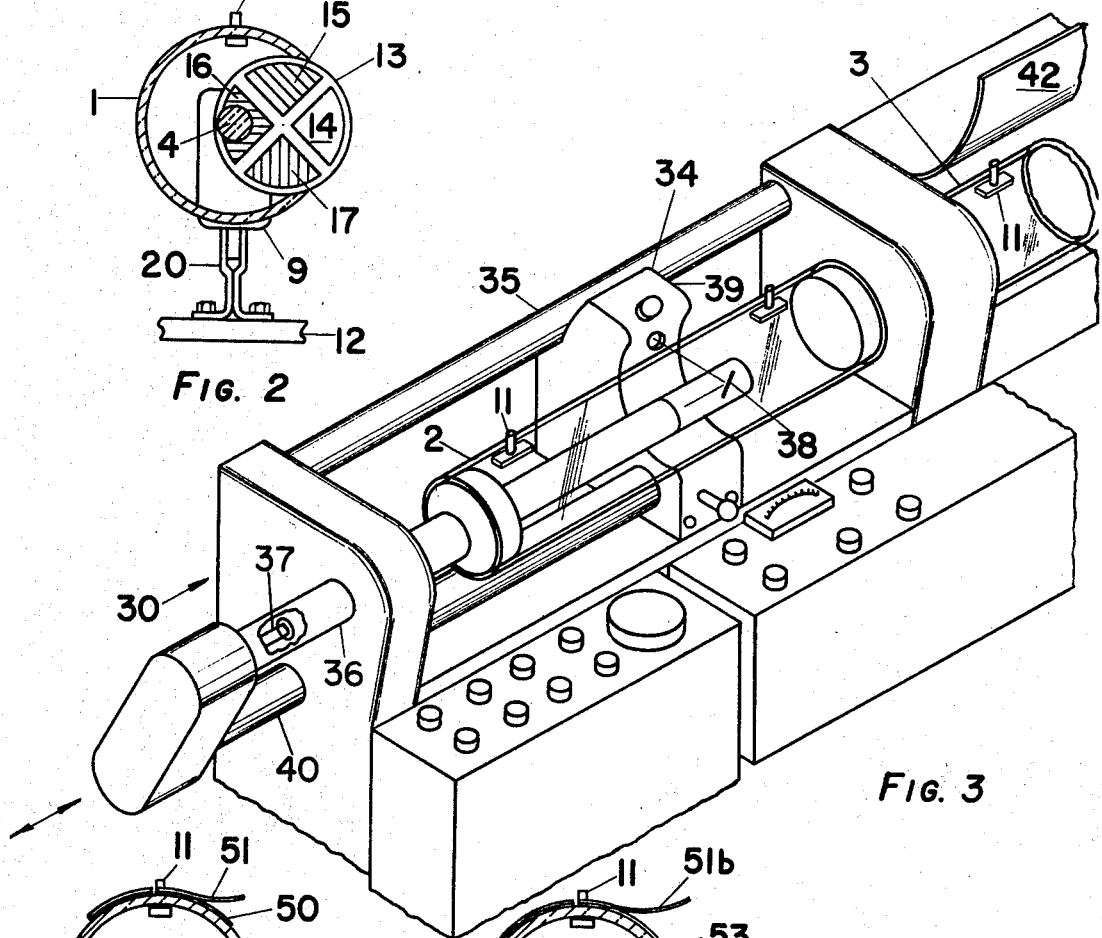
FIG. 3 is a view in perspective of a portion of an electronic scanner or color correction machine.
Figure 4:
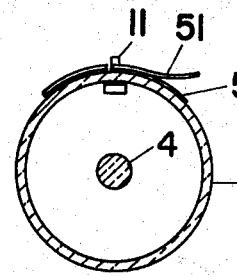
FIG. 4 is a diagrammatic view, illustrating the relation of the transparency and the photographic film when mounted on the apparatus of my invention.

Referring now to the electronic scanner or color correction machine, shown in FIG. 3, this machine consists of a scanning cylinder 2 and an exposing cylinder 3, which are mechanically connected so as to revolve at the same rate. A scanning head 34 slidably mounted on bar 35 is moved along bar 35 so as to scan the copy mounted on scanning cylinder 2. A pipe 36 runs along the longitudinal axis of the scanning cylinder 2 and contains a light 37 and a lens system not shown. The beam of light is reflected through mirror 38 into the photocell 39 of scanning head 34 through the copy mounted on the scanning cylinder 2. A second bar 40, driven by gears not shown, drives the scanning head 34 along bar 35 and is driven with pipe 36 so that the mirror 38 and scanning head 34 more in unison, in linewise progression. The exposing cylinder 3 is mechanically joined with the scanning cylinder 2 and contains a lamp 41, normally covered by cover 42 to expose the unexposed film on the exposing cylinder 3.

The details of the photoelectric transmission of copy from the scanning head 34 to the exposing lamp 41, are described in detail in U.S. Pats. 2,993,087 and 3,099,706. Basically, photocell currents obtained from pointwise and linewise scanning of the color transparency by means of a moving light spot are transmitted to the synchronously moving exposing lamp 41, to expose film mounted on exposing cylinder 3.

As previously indicated, however, if the transparency contains a defect or a portion which is desired to be removed from the exposed film, it is necessary to either manually retouch the transparency 50 or to prepare a photographic blocker 51b so that the image exposed onto the film 53 does not contain the undesired matter. Since the film 53 is mounted onto the exposing cylinder 3 which is of the same diameter and circumference as the scanning cylinder 2, a photographic blocker prepared from the transparency 50 in a standard printing frame will be out of register with the portion to be blocked on the exposing cylinder 3.

Figure 5:
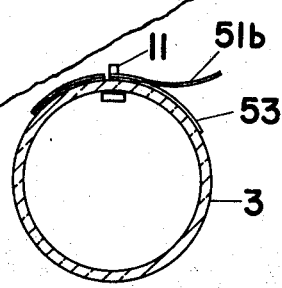
FIG. 5 is a diagrammatic view, illustrating the relation of the photographic blocker and the unexposed film on the exposing cylinder of the electronic scanner.

According to my invention, the transparency 50 is mounted on pins 11 around the exposing cylinder 1 of the apparatus of this invention. Thereafter, a photographic film 51 is mounted onto the pins so as to superimpose the transparency 50. Thereafter, by use of the light of proper intensity, or by use of light of a specific wave length, complementary to the color of the matter desired to be removed, the film is exposed by light from bulb 5 through the lenses 6 and 7 through the appropriate filter on filter wheel 13 which is directed along the longitudinal axis of light pipe 4 so that the film 51 is uniformly exposed through the transparency with only light corresponding to the matter desired to be removed. As is shown in FIG. 5, after the film is developed to produce a photographic blocker 51b, it is then mounted over the unexposed film 53 on the exposing cylinder 3 of the electronic scanner 30 and the image from the transparency 50 mounted on scanning cylinder 2 is photoelectrically transmitted to the exposing cylinder 3 and the undesired portions are effectively blocked by the photographic blocker 51b.

This may be better understood by reference to FIGS. 6 and 7 which diagrammatically illustrate the steps necessary to prepare a photographic blocker. As is illustrated, the color diapositive or transparency 50 is mounted on pins 11 and the unexposed film 51 is mounted over the transparency and held in position by pins 11.

In step A, light from light source 4 is transmitted through transparent cylinder 1, transparency 50 and exposes an image on film 51 which corresponds to the matter desired to be blocked.

In step B, the film 51 is developed to produce the photographic blocker 51b.

In step C, the transparency 50 is mounted on the scanning cylinder 2, again on pins 11 and the photocell 39 develops a photocell current through linewise and pointwise scanning of the cylinder.

In step D, the unexposed film 53 mounted on pins 11 of the exposing cylinder 3 is exposed by means of linewise and pointwise exposure from moving lamp 41 through the blocker 51b, which is in perfect registry with the image photoelectrically transmitted from the photocell current from photocell 39. Thus the exposed film 53 is not exposed to the image developed on photographic blocker 51b.

Referring now to FIG. 7, steps A and B are identical to steps A and B of FIG. 6. However, in step C, the photographic blocker 51b is mounted over the transparency 50 on scanning cylinder 2. Therefore, the light reflected from mirror 38 does not pass through the developed image on blocker 51b containing the portion desired to be removed and therefore is not picked up by photocell 39. Accordingly, the corrected image is photoelectrically transmitted to light 41 on the exposing cylinder 3 and thus exposes film 53 mounted thereon to the image desired to be transmitted.

In another modification for producing a blocker illustrated in FIG. 8, the transparency is mounted over exposing cylinder 1 and the unexposed film 51 is superimposed over it. However, in this instance, only the desired portion of the transparency is exposed on film 51. Thereafter, in step 2, the film 51 containing the desired image is developed as 51d. Developed film 51d has now been corrected as to curvature displacement. In step 3, the developed film 51d is mounted over unexposed film 51e in a flat plane and exposed so that only the desired portion of the image of the transparency remains unexposed on film 51e while the remainder of the film is exposed. Thereafter, in step 4, the film 51e is developed to produce blocker 51b which may be used to block a portion of an image by the steps previously described in FIGS. 6 and 7. While in the claims, some of the steps require exposure through the transparency of only the portion of the image thereon to be blocked, it is intended that the procedure illustrated in FIG. 8 be construed to meet this limitation. While only the desired image is first exposed through the transparency onto the film 51 in step 1, the developed film 51d is used to expose only the portion desired to be blocked on film 51e in step 3 and thus meets the intended limitations of the claims.

DEFINITIONS

In the specification and claims, several terms have been used which should be defined for purposes of clarity.

Film.—Photographic film refers to any photographically sensitive matter on a sheet-like backing. The term encompasses carbon tissue, as well as the silver halide films.

Altering characteristics of light.—Altering the characteristics of light means to change the effective wave length or intensity of the light transmitted onto a photographically sensitive material. Since light is made up of waves of the electromagnetic spectrum, in white light all wave lengths are present. Consequently, altering the wave length means to change the effective wave length reaching the substrate by filtering out other wave lengths or spectrally separating same. Altering intensity means to increase or decrease light energy transmitted onto a photographically sensitive material.

Density.—Density refers to the relationship of incident light to reflected or transmitted light.

I claim:
1. An apparatus for producing a photographic blocker for color correction, used to block portions of a particular wave length light image in a color reproduction machine in which said light is picked up from a transparency mounted on a first curved surface of said color reproduction machine and which is then transmitted to a second curved surface, identical to said first curved surface which carries a photographic film; said apparatus for producing said photographic blocker comprising,
 (a) a third curved surface of identical curvature to said first curved surface for mounting said transparency in contact with a second photographic film;
 (b) mounting means for mounting said transparency and said photographic film on said third curved surface;
 (c) a light transmitter, placed relative to said third curved surface to transmit light and to uniformly expose said second photographic film through said transparency; and
 (d) means for altering wave length characteristics of said light in accordance with the color correction to be effected.

2. An apparatus, as defined in claim 1, in which the means for altering the characteristics of said light includes means for varying the intensity of said light.

3. An apparatus, as defined in claim 1, in which the curved surface is a cylinder.

4. An apparatus, as defined in claim 3, in which the cylinder is transparent and the light transmitter is on the inside of the cylinder.

5. An apparatus, as defined in claim 4, in which:
 (A) said light transmitter comprises:
  1. an elongated light pipe which allows light to escape uniformly around its circumference and along its usable length, said elongated light pipe being mounted at the midpoint of the diameter of said cylinder, with its long axis coinciding with the long axis of said cylinder; and
  2. a light source at the end of said light pipe to direct light along the length of said light pipe.

6. An apparatus, as defined in claim 5, in which said elongated light pipe is a transparent rod having a uniformly roughened light diffusing circumferential surface.

7. An apparatus, as defined in claim 6, in which said elongated transparent rod is fabricated of a fiber optic material.

8. An apparatus, as defined in claim 6, in which a light source of equal intensity is placed at the other end of said rod.

9. An apparatus, as defined in claim 5, in which a means for altering the wave length of the light is interposed between the light source and the end of said light pipe.

10. An apparatus, as defined in claim 3, in which
 (A) the mounting means comprises a series of pins on said cylinder.

11. A process for blocking a portion of a particular wave length light image photoelectrically transmitted from a transparency to a photographic film in a color reproduction machine, which comprises:
 (A) placing the transparency and a first photographic film over a curved surface,
 (B) uniformly transmitting light through said transparency to expose said first photographic film to only a particular wave length complementary to the portion of said image to be blocked and developing said film to produce a photographic blocker,
 (C) transferring the transparency to a second curved surface having an identical curvature as said first curved surface,
 (D) transferring the photographic blocker to a third curved surface having an identical curvature to said first curved surface and mounting said blocker and a sheet of unexposed photographic film on said third curved surface in identical relation to the relation of said first unexposed film and said transparency; said third curved surface being in operative relation to said second curved surface and operating as the transmitting and receiving surfaces of said color correction machine,
 (E) photoelectrically transmitting the image from said transparency through said photographic blocker onto said sheet of photographic film and said photographic blocker acting to block the portion of said image desired to be blocked.

12. A process for blocking a portion of an image, as defined in claim 11, in which the light transmitted through said transparency is of such intensity relative to the density of the portion of the image to be blocked, to expose only said portion of said image on said photographic film.

13. The process for blocking a portion of an image, as defined in claim 11, in which said first and second curved surfaces are transparent cylindrical surfaces.

14. The process for blocking a portion of an image, as defined in claim 13, in which said first photographic film is superimposed over said transparency.

15. The process for blocking a portion of an image, as defined in claim 13, in which said first photographic film is superimposed over said transparency and the light is transmitted uniformly from within the cylindrical surface.

16. A process for blocking a portion of an image, as defined in claim 11, which comprises mounting said developed first film over a second photographic film in a flat plane, exposing said second photographic film through the developed first film and developing said second film to produce a photographic blocker.

17. A process for making a photographic blocker, for blocking a portion of a particular wave length light image photoelectrically transmitted from a transparency to a photographic film in a color reproduction machine which comprises:
(A) placing a transparency and a first photographic film over a curved surface,
(B) uniformly transmitting light of the desired wave length to be blocked through said transparency to expose said photographic film only to the portion of said image on said transparency to be blocked,
(C) developing said photographic film and producing a photographic blocker.

18. The process of making a photographic blocker, as defined in claim 17, the further step of varying the intensity of the light relative to the density of the portion of the transparency to be blocked.

19. The process of making a photographic blocker, as defined in claim 17, in which said curved surface is a transparent cylindrical surface.

20. The process of making a photographic blocker, as defined in claim 17, in which said photographic film is superimposed over said transparency.

21. The process of making a photographic blocker, as defined in claim 20, in which said light is transmitted uniformly from within the cylindrical surface.

22. A process of making a photographic blocker, as defined in claim 17, in which said developed first photographic film is the photographic blocker.

23. A process for making a photographic blocker, as defined in claim 17, in which said developed first photographic film is mounted over a second photographic film in a flat plane and said second photographic film is exposed through said developed first film and is developed to produce a photographic blocker.

24. A process for blocking a portion of a particular wave length image photoelectrically transmitted from a transparency to a photographic film in a color reproduction machine which comprises:
(A) placing the transparency and a first photographic film over a first curved surface,
(B) uniformly transmitting light through said transparency to expose said first photographic film to only a particular wave length complementary to the portion of said image to be blocked, and developing said film to produce a photographic blocker,
(C) transferring said transparency and said photographic blocker to a second curved surface, having an identical curvature as said first surface and mounting said blocker and said transparency in identical relation on said second curved surface, to the relation of said first film and transparency on said first curved surface,
(D) mounting a sheet of unexposed photographic film on a third curved surface, having an identical curvature to said first curved surface, said third curved surface being in operative relation to said second curved surface,
(E) photoelectrically transmitting the image from said transparency through said photographic blocker onto said sheet of photographic film and blocking the portion of said image desired to be blocked.

25. A process for blocking a portion of an image, as defined in claim 24, in which the light transmitted through said transparency to expose said first photographic film is of proper intensity relative to the density of the portion of the transparency to be blocked to expose only the portion to be blocked on said first photographic film.

26. The process for blocking a portion of an image as defined in claim 24, in which said first and second curved surfaces are transparent cylindrical surfaces.

27. The process for blocking a portion of an image as defined in claim 24, in which said first photographic film is superimposed over said transparency.

28. The process for blocking a portion of an image as defined in claim 27, in which said light is transmitted uniformly from within the cylindrical surface.

29. A process for blocking a portion of an image, as defined in claim 24, which comprises mounting said developed first film over a second photographic film in a flat plane, exposing said second photographic film through the developed first film, and developing said second photographic film to produce a photographic blocker.

References Cited
UNITED STATES PATENTS

| | | | |
|---|---|---|---|
| 2,478,555 | 8/1949 | Yule | 178—6 |
| 3,288,607 | 11/1966 | Middleton | 96—36.2 |

ROBERT L. GRIFFIN, Primary Examiner

B. L. LEIBOWITZ, Assistant Examiner